United States Patent [19]

Perona

[11] Patent Number: 5,210,664
[45] Date of Patent: May 11, 1993

[54] LOW PROFILE TAPE DRIVE FOR DRIVING A MINI-DATA CARTRIDGE

[75] Inventor: Mark W. Perona, San Diego, Calif.

[73] Assignee: Iomega Corporation, Roy, Utah

[21] Appl. No.: 706,213

[22] Filed: May 28, 1991

[51] Int. Cl.$^5$ .................... G11B 15/32; G11B 5/55; G11B 5/56

[52] U.S. Cl. .................... 360/93; 360/96.3; 360/106; 360/109

[58] Field of Search ............ 242/192, 197–199; 360/93, 90, 96.3

[56] References Cited

U.S. PATENT DOCUMENTS

| | | | |
|---|---|---|---|
| 3,526,371 | 9/1970 | Blackie et al. | 242/200 X |
| 3,924,823 | 12/1975 | Cohen et al. | 242/198 |
| 3,976,262 | 8/1976 | Kennedy | 242/192 |
| 4,573,091 | 2/1986 | Barton, Jr. et al. | 360/93 |
| 4,647,994 | 3/1987 | Irwin et al. | 360/85 |
| 4,836,465 | 6/1989 | May et al. | 360/192 |
| 4,863,114 | 9/1989 | Moeller | 242/199 X |
| 4,982,911 | 1/1991 | Newell | 360/96.3 |
| 4,984,111 | 1/1991 | Rudi | 360/93 X |
| 5,081,551 | 1/1992 | Aruga | 360/97.01 |

Primary Examiner—Robert S. Tupper
Attorney, Agent, or Firm—Woodcock Washburn Kurtz Mackiewicz & Norris

[57] ABSTRACT

A magnetic tape drive for driving magnetic tape in a cartridge of the type in which a driven roller in an exposed edge of the cartridge moves the tape past a read/write head in the drive. A drive roller in the drive is rotated by a motor. The drive roller engages an idler capstan which, in turn, engages the driven roller in the cartridge.

9 Claims, 3 Drawing Sheets

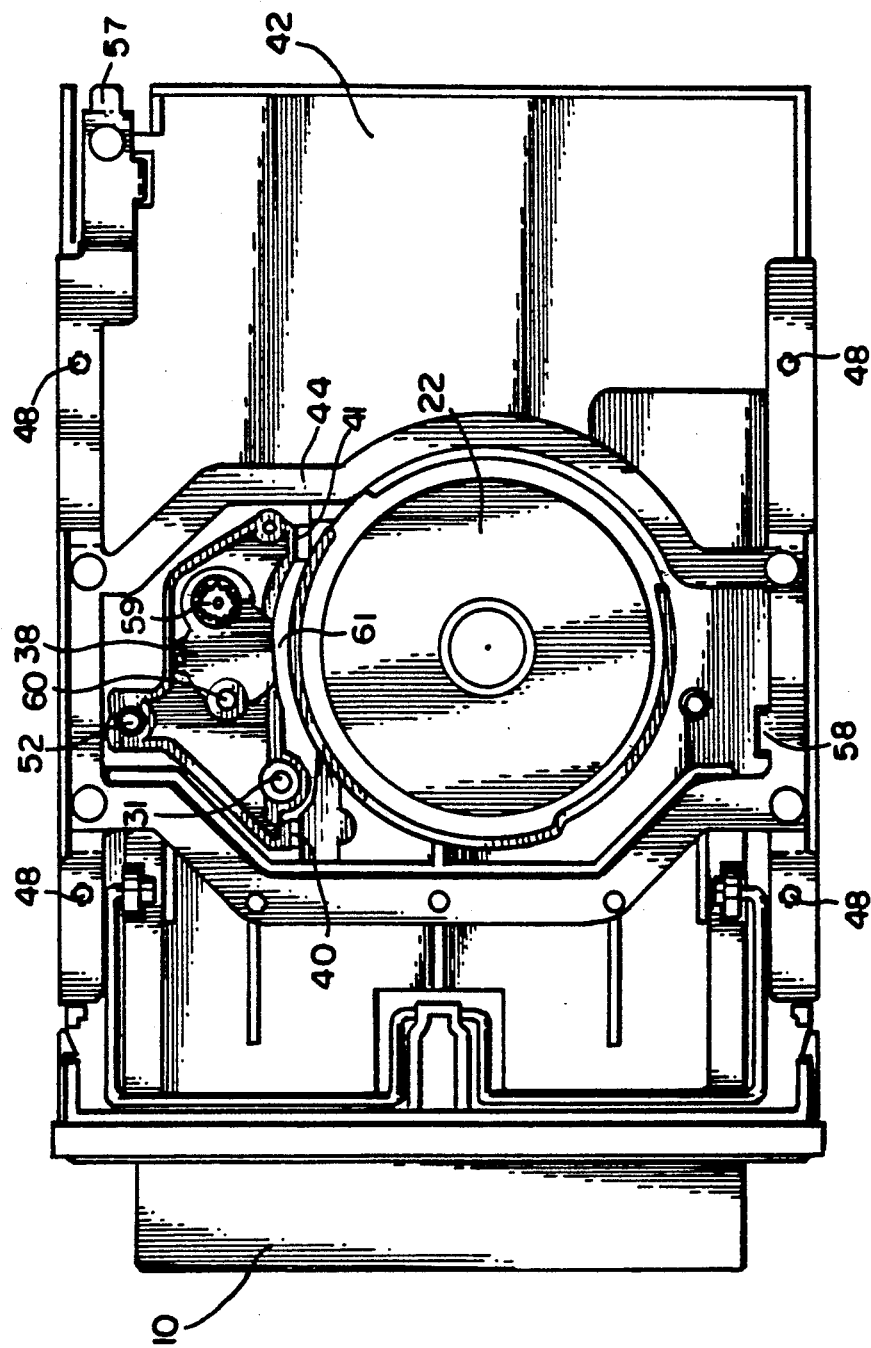

LOW PROFILE TAPE DRIVE FOR DRIVING A MINI-DATA CARTRIDGE

FIELD OF THE INVENTION

This invention relates to a magnetic tape drive and more particularly, to a low profile drive for a magnetic tape cartridge of the type in which a driven roller mounted in an exposed edge of the cartridge moves tape past a read/write head in the drive.

BACKGROUND OF THE INVENTION

U.S. Pat. No. 4,863,114 to Moeller, et al shows a mini-cartridge in which ¼" magnetic tape stores computer data. The tape is moved between two reels in the cartridge by a driven roller. The driven roller moves the tape and also moves the reels through a belt arrangement. The driven roller is engaged by a drive roller in the drive when the cartridge is inserted into the drive.

Magnetic tape drives for use with this type of cartridge are available from a number of sources. U.S. Pat. Nos. 3,526,371 to Blackie, et al; 3,924,823 to Cohen, et al; 4,647,994 to Irwin, et al; and 4,984,111 to Rudi, are examples of drives utilizing this type of data cartridge. These drives are mounted in a cabinet and rack containing a personal computer and peripherals. These drives are generally available in a size which has a height of approximately 1⅝ inches. In the drives shown in the foregoing patents, the drive roller is directly driven by the motor. In other versions, the drive roller may be driven by a belt.

The present invention is an improvement upon the tape drives discussed above.

SUMMARY OF THE INVENTION

In accordance with the present invention, the driven roller in a magnetic tape cartridge is driven by an idler capstan that, in turn, is driven by a drive roller on the cartridge drive motor.

The invention has an important advantage over prior tape drives in that the height of the drive is considerably smaller than in previous drives. The drive of the present invention fits within the one inch high opening that is common for disk drives for 3½" floppy disks.

The present invention also has the advantage that the speed of the tape is not affected by changes in the diameter of the resilient idler capstan because it transmits the tangential velocity of the motor roller. Therefore, the diameter of the idler capstan need not be tightly controlled. In both the direct drive and belt drive designs, the diameter of the resilient drive roller directly affects the speed of the cartridge and must be held to tight tolerances. In addition, in a belt driven design, the thickness of the belt needs to be tightly controlled. In the idler capstan drive of the present invention, only the diameter of the motor drive roller requires tight tolerances, and this is easily controlled because it is metal, not a difficult to control resilient material.

Because the pre-load force of the motor is transmitted to the cartridge by the idler capstan, the bearings in the idler are very lightly loaded, allowing the use of a low cost bushing instead of the ball bearings required in a belt driven design. Furthermore, fewer components are required than in a belt driven design.

Further in accordance with the invention, a mount for the magnetic head provides an azimuth adjustment for the head with respect to the translational motion of the tape. The mount is integrally molded with the drive frame and resiliently connected to the frame.

Further in accordance with the invention, a metal bracket attached to the drive frame provides means for mounting the drive in the rack and cabinet normally provided for a personal computer and its peripherals. The bracket is flexible and protects the drive frame from mounting stresses which might otherwise damage the frame. The metal bracket also provides an electrical ground and shield for the electronics of the drive.

The foregoing and other objects, features and advantages of the invention will be better understood from the following more detailed description and appended claims.

SHORT DESCRIPTION OF THE DRAWINGS

FIG. 3 is a bottom plan view of the drive.

DESCRIPTION OF THE PREFERRED EMBODIMENT

Figure 1:
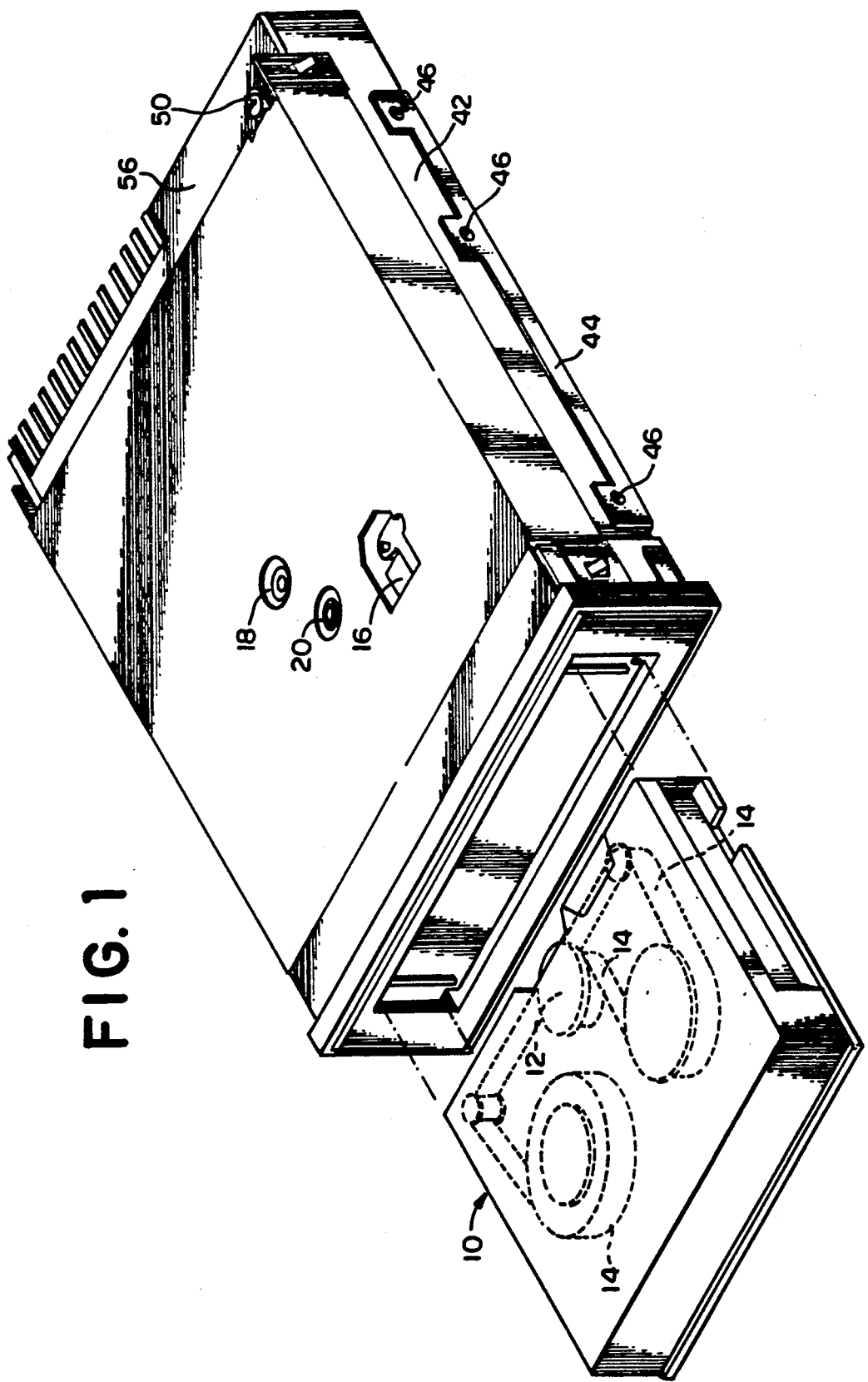
FIG. 1 is a perspective view of the tape drive of the present invention.
Figure 2:
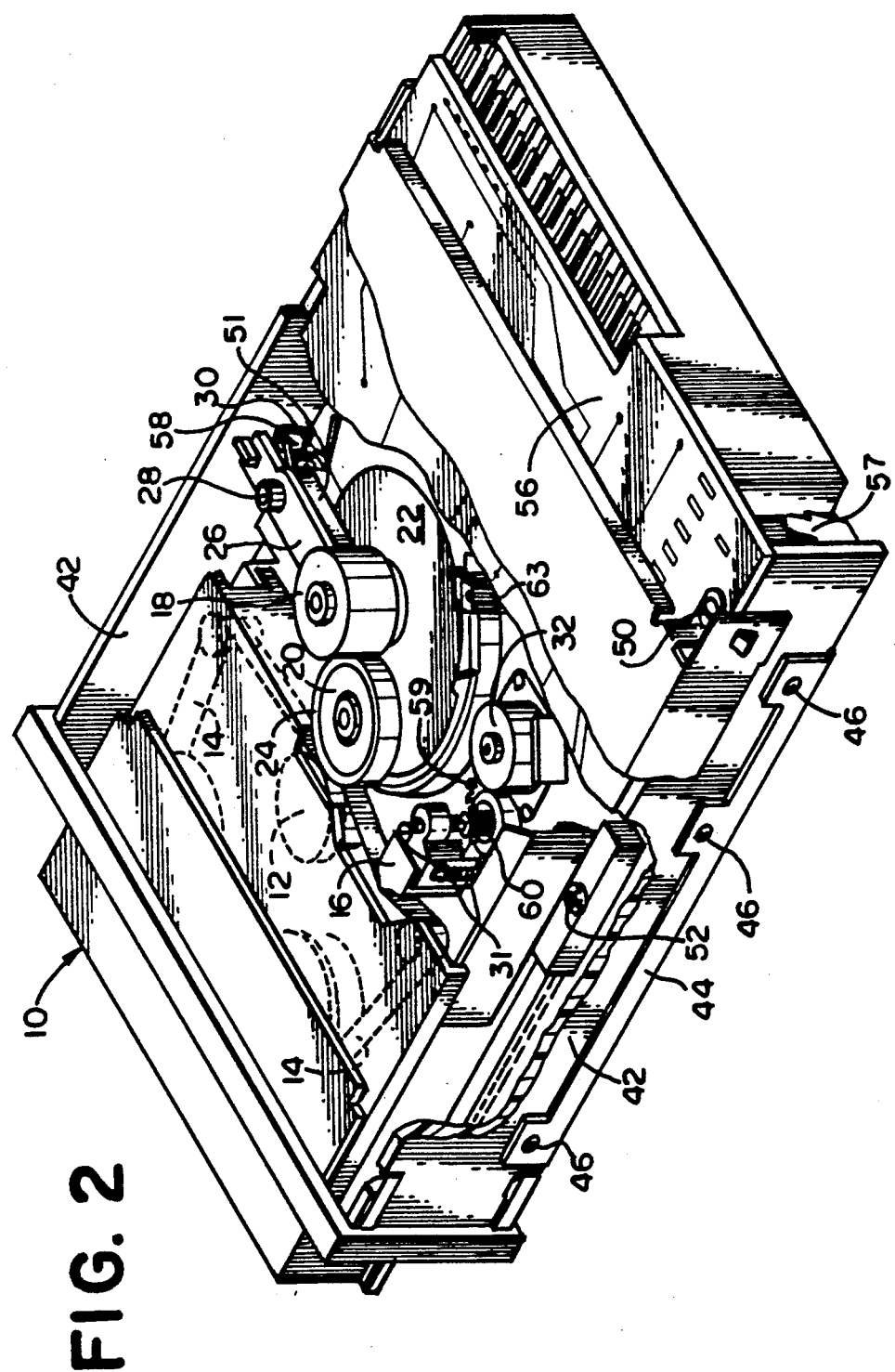
FIG. 2 is a partially broken away perspective view of the drive.

A magnetic tape cartridge 10 has a driven roller 12 in the cartridge for moving magnetic tape 14 past a read/write head 16 (FIG. 2) in the tape drive. The cartridge 10 is generally rectangular in shape and has two reels upon which the tape is wound and unwound. The driven roller 12 is in an exposed edge of the cartridge.

In accordance with present invention, the drive roller 18 in the drive is engaged by an idler capstan 20. The drive roller 18 is directly driven by the motor 22. The drive roller 18 engages the idler capstan 20 to rotate it. Idler capstan 20 has a resilient periphery 24. When a cartridge is inserted into the drive, the driven roller 12 in the cartridge engages the resilient periphery 24 of the drive roller 18. The idler capstan 20 and the driven roller 12 are rotated by drive roller 18 to move the magnetic tape in the cartridge. Because of the use of the idler capstan 20, changes in the diameter of the idler capstan, caused by wear of the resilient periphery, do not affect the speed of the tape. The diameter of the idler capstan 20 need not be tightly controlled.

In accordance with the present invention, the drive roller 18 is mounted on the motor 22. The idler capstan 20 is mounted on arm 51 which is pivoted at 28. Bracket 26 supports pivot 28. The motor 22 is also pivoted about 28. The spring 30 biases the motor 22 and the idler capstan 20 toward the cartridge. When a cartridge is inserted into the drive, the driven roller 12 presses against the idler capstan 20 to move the motor 22 and the arm 51, and idler capstan 20, slightly against the bias provided by spring 30. This provides firm engagement between idler capstan 20 and driven roller 12. Guide 63 constrains vertical movement of motor 22 as the motor moves slightly about pivot 28.

The mounting of the idler capstan 20 and drive roller 18 on top of the motor 22, with the entire assembly being pivoted, is important to the low profile of the drive. In prior designs in which the driven roller in the cartridge is driven directly by the drive roller on the motor, more height is required to insert the cartridge over the motor. The present invention provides a significant height advantage in drives of this type.

Magnetic read/write head 16 is mounted on a rail 31 for movement along the rail transverse to the longitudinal direction of the tape. A stepper motor 32 drives a gear train 59 which rotates the screw jack 60 to move the magnetic head 16 in increments across the tracks of the magnetic tape.

Further in accordance with the present invention, the read/write head 16, rail 31 and stepper motor 32 are on a mount 38, which is shown in FIG. 3. Mount 38 is integrally molded with the drive frame 42. Mount 38 is flexibly connected at 40 and 41 to the drive frame 42. The space 61 allows the mount 38 to move with respect to frame 42. As the mount 38 is moved with respect to frame 42, by rotating adjusting screw 52, the azimuth of the magnetic head with respect to the translational motion of the tape is adjusted. This provides an important accuracy adjustment for reading and writing on the tape.

Frame 42 is made of plastic which is not a good conductive material and which can be warped if severely stressed during mounting. A flexible metal mounting bracket 44 is connected to the plastic frame 42. Metal bracket 44 has six screw holes 46 (FIG. 2) and four screw holes 48 for mounting the drive in a cabinet having a rack for the personal computer and other peripherals. The metal bracket 44 provides a good electrical connection to the cabinet which the plastic frame 42 does not otherwise provide. The metal bracket is connected at 50 to the printed circuit board to provide a positive electrical ground for the circuit board. The mounting bracket is flexible so that it absorbs the stress which occurs during mounting in a rack having slightly non-standard dimensions.

While a particular embodiment of the invention has been shown and described, various modifications of the invention are within the true spirit and scope of the invention. All such modifications are encompassed by the following claims.

What is claimed is:

1. A magnetic tape drive for driving magnetic tape in a cartridge of the type in which a driven roller in said cartridge moves said tape past a read/write head in said driven, said drive comprising:
   a motor;
   a drive roller driven by said motor; an idler capstan engaged by said drive roller and engaging said driven roller through an opening in said cartridge when said cartridge is inserted into said drive to move said tape past said read/write head; and
   a pivoted arm, said idler capstan being mounted on said arm, said arm being biased so that said idler capstan is biased into engagement with said driven roller when said cartridge is inserted into said drive.

2. The magnetic tape drive recited in claim 1 wherein said motor is mounted on said pivoted arm.

3. The magnetic tape drive recited in claim 2 wherein said drive roller and said idler capstan are mounted in side by side relationship on said motor.

4. The magnetic tape drive recited in claim 1 wherein said magnetic head is mounted on a rail for movement transverse to the longitudinal direction of said tape.

5. The magnetic tape drive recited in claim 4 further comprising:
   a frame for said drive, said motor, said drive roller and said capstan being movably mounted in said frame.

6. The tape drive recited in claim 5 further comprising:
   a head mount integrally molded with said frame, said rail on which said magnetic head moves being mounted on said head mount, said head mount being flexibly attached to said frame so that the azimuth of said magnetic head with respect to longitudinal movement of said tape can be adjusted by moving said mount with respect to said frame.

7. The tape drive recited in claim 5 wherein said frame is plastic;
   said drive further comprising:
   a flexible metal mounting bracket connected to said frame, said bracket having means for attachment to a computer enclosure, said metal bracket providing electrical grounding for said drive.

8. The magnetic tape drive recited in claim 1 wherein said cartridge is generally rectangular in shape and has two reels upon which said tape is wound and unwound, said driven roller being mounted in an exposed edge of said cartridge.

9. The magnetic tape drive recited in claim 8 wherein said cartridge has a belt interconnecting said driven roller and said reels.

* * * * *